US008819572B2

(12) United States Patent
Jeong et al.

(10) Patent No.: US 8,819,572 B2
(45) Date of Patent: Aug. 26, 2014

(54) MOBILE TERMINAL SUPPORTING DETACHABLE MEMORY CARDS AND DETACHABLE MEMORY CARD MANAGEMENT METHOD THEREOF

(75) Inventors: Ha Young Jeong, Seoul (KR); Young Mi Kim, Seoul (KR); Su Jung Youn, Uijeongbu-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 693 days.

(21) Appl. No.: 12/942,189

(22) Filed: Nov. 9, 2010

(65) Prior Publication Data

US 2011/0131490 A1  Jun. 2, 2011

(30) Foreign Application Priority Data

Dec. 1, 2009 (KR) .................. 10-2009-0117883

(51) Int. Cl.
*G06F 3/048* (2013.01)
*G09G 5/00* (2006.01)
*G06F 3/0481* (2013.01)

(52) U.S. Cl.
CPC .......... *G06F 3/0481* (2013.01); *G06F 3/04817* (2013.01)
USPC ......................... 715/772; 345/156

(58) Field of Classification Search
CPC ..................... G06F 3/0481; G06F 3/04817
USPC .................. 715/769, 770, 863, 772; 345/156
See application file for complete search history.

(56) References Cited

U.S. PATENT DOCUMENTS

| 2001/0004268 | A1 | 6/2001 | Kubo et al. | |
| 2004/0032394 | A1* | 2/2004 | Ayatsuka et al. | 345/156 |
| 2005/0177796 | A1 | 8/2005 | Takahashi | |
| 2007/0035513 | A1* | 2/2007 | Sherrard et al. | 345/157 |
| 2007/0058053 | A1 | 3/2007 | Shimizu | |
| 2008/0052945 | A1* | 3/2008 | Matas et al. | 34/173 |
| 2008/0077874 | A1 | 3/2008 | Garbow et al. | |
| 2009/0228823 | A1* | 9/2009 | Edwards et al. | 715/772 |
| 2009/0231233 | A1 | 9/2009 | Liberatore | |
| 2010/0138765 | A1* | 6/2010 | Rainisto | 715/766 |
| 2010/0146425 | A1* | 6/2010 | Lance et al. | 715/769 |

FOREIGN PATENT DOCUMENTS

| EP | 0661621 A1 | 7/1995 |
| EP | 1 519 278 A1 | 3/2005 |
| WO | 01-86640 A2 | 11/2001 |

* cited by examiner

*Primary Examiner* — Haoshian Shih
(74) *Attorney, Agent, or Firm* — Jefferson IP Law, LLP

(57) ABSTRACT

A mobile terminal supporting detachable memory cards and a method for managing the detachable memory cards attached to the mobile terminal is provided. The detachable memory card management method of the present invention includes displaying, if at least two memory cards are detected, icons representing the memory cards on an idle mode screen, detecting selection of at least one of the icons, and creating files, stored in a source memory card represented by one of the selected icons, in a destination memory card represented by another icon. The detachable memory card management method of the present invention is capable of displaying the card icons representing the memory cards attached to the mobile terminal on the idle mode screen such that the user can identify the attached memory cards.

15 Claims, 17 Drawing Sheets

<a>

<b>

<c>

FIG. 11
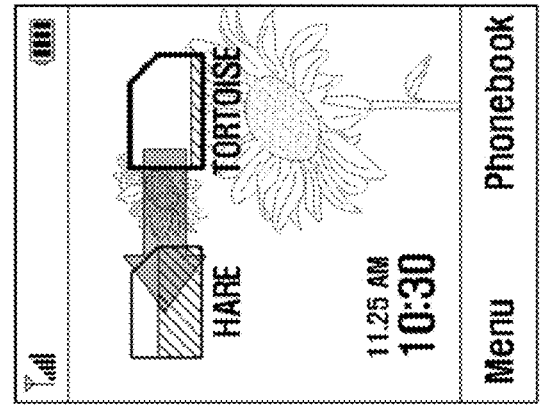
<a>
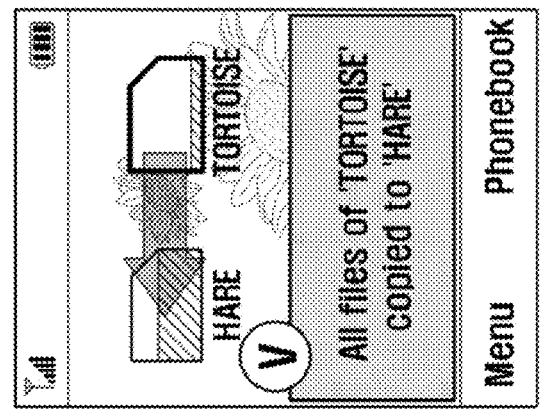
<b>
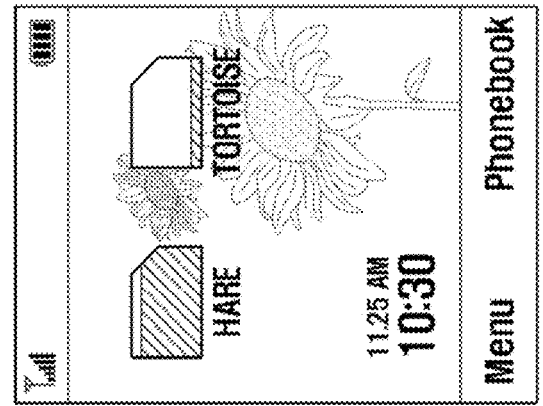
<c>

FIG. 12
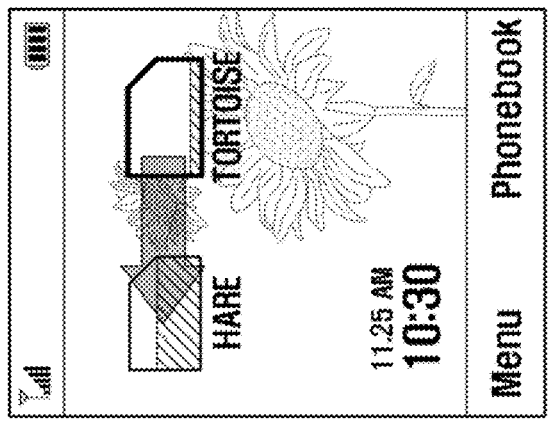
<a>
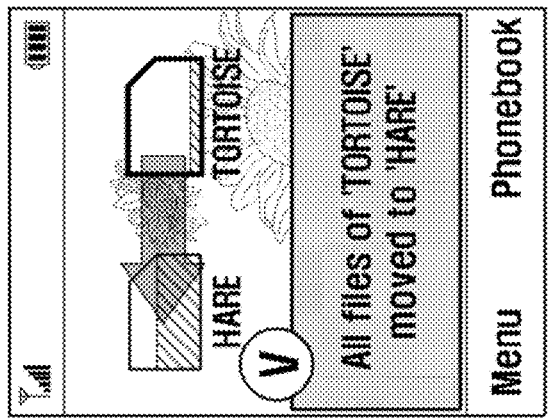
<b>
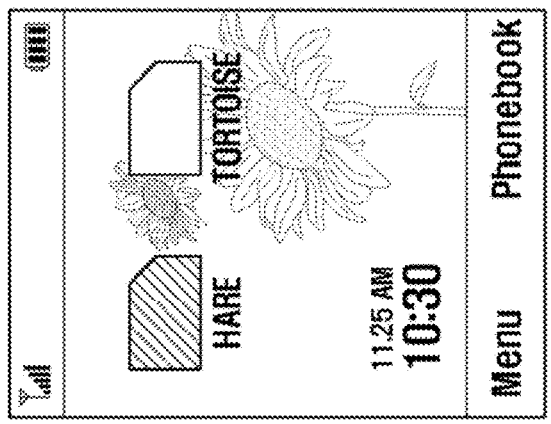
<c>

FIG. 17
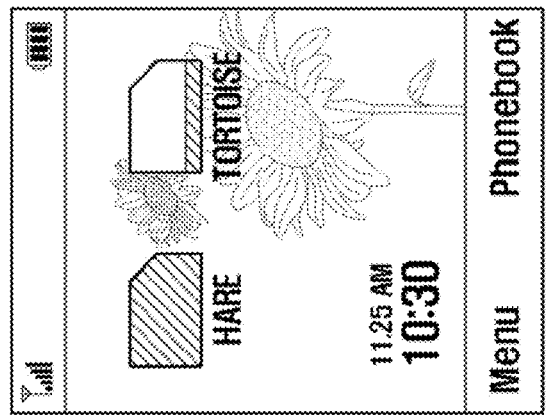
<c>
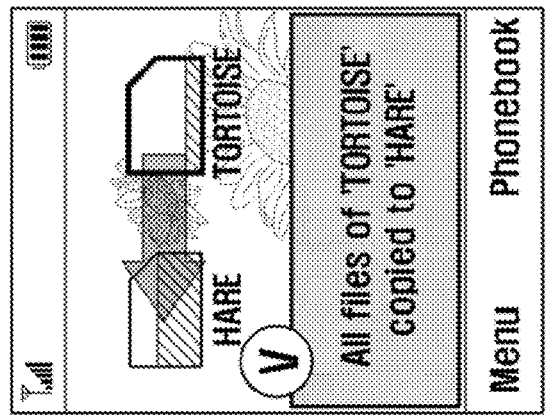
<b>
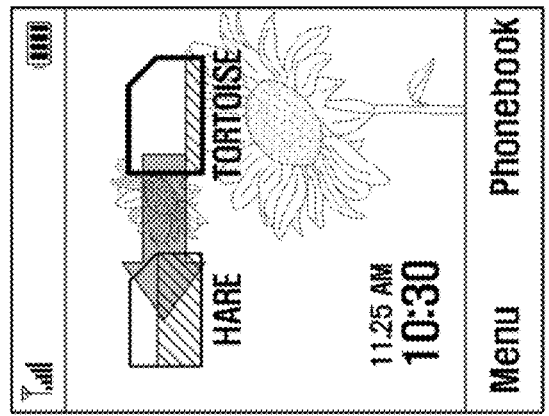
<a>

FIG. 18
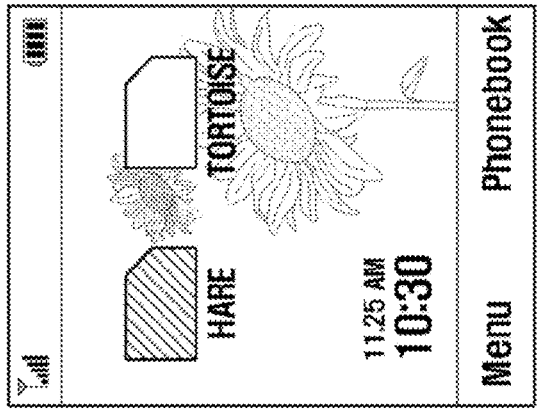
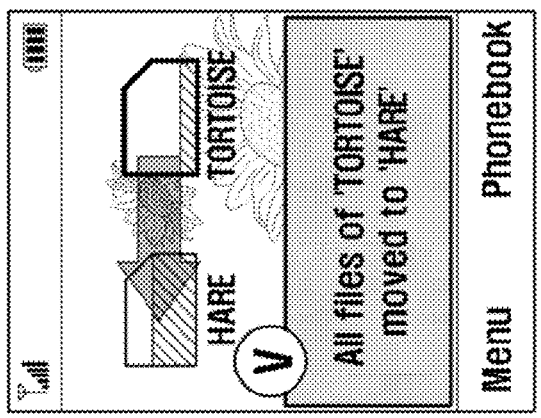
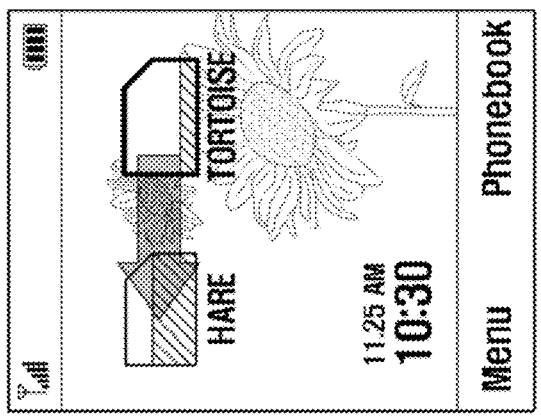

MOBILE TERMINAL SUPPORTING DETACHABLE MEMORY CARDS AND DETACHABLE MEMORY CARD MANAGEMENT METHOD THEREOF

PRIORITY

This application claims the benefit under 35 U.S.C. §119(a) of a Korean patent application filed on Dec. 1, 2009 in the Korean Intellectual Property Office and assigned Serial No. 10-2009-0117883, the entire disclosure of which is hereby incorporated by reference.

BACKGROUND OF THE INVENTION

1. Field of the Invention

The present invention relates to a mobile terminal. More particularly, the present invention relates to a mobile terminal supporting detachable memory cards and a method for managing the detachable memory cards attached to the mobile terminal.

2. Description of the Related Art

Nowadays, mobile terminals include various supplementary functions such as messaging, wireless Internet access, a phonebook, a schedule organizer, a memo function, an MP3 player, and a digital camera. With so many diverse functions, the management of the large amount of information generated in association with the various supplementary functions has become a significant issue.

Typically, a mobile terminal manages information with its internal memory. However, the increase in volume and the large number of different types of information to be processed has caused a storage space shortage problem. Also, the loss of a mobile terminal filled with various types of information is likely to cause significant problems such as permanent loss of useful information or illegal use of private information.

In order to address these problems, data management methods using various types of detachable memory cards have been introduced. In the detachable memory card-based data management method, when the detachable memory is attached to the mobile terminal, the mobile can store the information in the detachable memory and retrieve previously stored information from the detachable memory.

However, the conventional detachable memory card-based information management method has a drawback in that it is not easy to check the attachment/detachment of the memory card or process the information stored in the detachable memory card. For example, in order to check the attachment of the detachable memory card, the mobile terminal has to enter a specific menu mode through relatively complex steps. Furthermore, the complexity increases with the use of multiple detachable memory cards, resulting in even greater deterioration of user convenience. There is therefore a need to develop an efficient detachable memory management method for a mobile terminal.

SUMMARY OF THE INVENTION

An aspect of the present invention is to address at least the above-mentioned problems and/or disadvantages and to provide at least the advantages described below. Accordingly, an aspect of the present invention is to provide a mobile terminal and method for managing detachable memory cards that is capable of improving user's convenience and information security.

In accordance with an aspect of the present invention, a method for managing memory cards is provided. The method includes displaying, if at least two memory cards are detected, icons representing the memory cards on an idle mode screen, detecting selection of at least one of the icons, and creating files, stored in a source memory card represented by one of the selected icons, in a destination memory card represented by another icon.

In accordance with another aspect of the present invention, a mobile terminal is provided. The terminal includes at least two detachable memory cards for storing files, a display unit for displaying icons representing the attached memory cards, and a control unit for detecting selection of at least one of the icons for transferring the files stored in a source memory card represented by one of the selected icons to a destination memory card represented by the other icon.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 9 to 13 are screen images displayed during a file management process according to an exemplary embodiment of the present invention;

FIGS. 15 to 20 are screen images displayed during a file management process according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
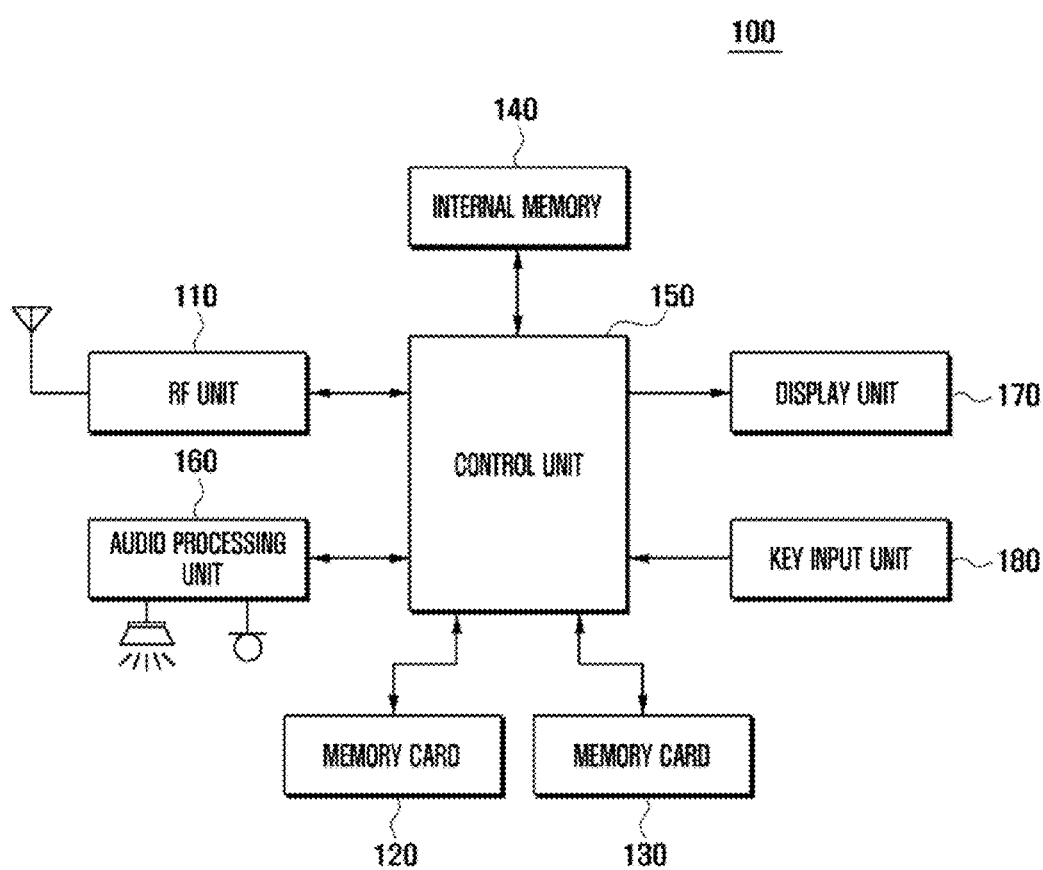
FIG. 1 is a block diagram illustrating a configuration of a mobile terminal according to an exemplary embodiment of the present invention.

FIG. 1 is a block diagram illustrating a configuration of a mobile terminal according to an exemplary embodiment of the present invention.

Referring to FIG. 1, a mobile terminal 100 includes a Radio Frequency (RF) unit 110, at least two memory cards 120 and 130, an internal memory 140, a control unit 150, an audio processing unit 160, a display unit 170, and a key input unit 180.

The RF unit 110 is responsible for radio communication of the mobile terminal 100. The RF unit 110 includes an RF transmitter for up-converting and amplifying transmission signals and an RF receiver for low-noise-amplifying and down-converting received signals.

Each of the memory cards 120 and 130 stores information of the mobile terminal 100 and provides the mobile terminal with stored information upon request. The memory cards 120 and 130 are detachable memory cards that can be attached to and removed from the mobile terminal 100. Each of the memory cards 120 and 130 can be any of a Secure Digital (SD) card, a micro SD card, a mini SD card, and a MultiMedia Card (MMC). The memory cards 120 and 130 can store files. Furthermore, the memory cards 120 and 130 can group the files into folders.

The internal memory 140 stores information of the mobile terminal 100. The internal memory 140 is built into the mobile terminal 100. The internal memory 140 can include a program memory and a data memory. The program memory stores application programs associated with the functions of the mobile terminal 100. According to an exemplary embodiment of the present invention, the program memory can store an application program for managing the memory cards 120 and 130. The data memory stores data generated while the application programs are running.

The control unit 150 is responsible for controlling operations of the mobile terminal 100. The control unit 150 includes a data processing unit (not shown) having a transmitter for encoding and modulating the transmission signals and a receiver (not shown) for demodulating and decoding the received signals. The data processing unit can include a modem and a codec. The codec can include a data codec for processing packet data and an audio codec for processing audio signal including voice. According to an exemplary embodiment of the present invention, the control unit 150 monitors to detect the attachment of the memory cards 120 and 130 and controls, when the memory cards 120 are attached, the display unit 170 to display the corresponding card icons. Here, the card icons can be designed with images and texts that identify the respective memory cards 120 and 130. According to an exemplary embodiment of the present invention, the control unit 150 can copy and move files stored among the memory cards 120 and 130 and the internal memory 140. According to an exemplary embodiment of the present invention, the control unit 150 can control to display the files stored in at least one of the memory cards 120 and 130. According to an exemplary embodiment of the present invention, the control unit 150 can control such that, when one of the memory cards 120 and 130 is attached or detached, a corresponding card icon appears or disappears on the standby screen.

The audio processing unit 160 processes a received audio signal output by the audio codec of the data processing to output through a speaker and delivers an audio signal input through a microphone to the audio codec of the data processing unit.

The display unit 170 displays video data output by the control unit 150. The display unit 170 can be implemented with a Liquid Crystal Display (LCD). In this case, the display unit 170 can be provided with a video memory for storing video data and LCD devices. In case that a touchscreen-enabled LCD is used, the display unit 170 can also act as an input unit.

The key input unit 180 is provided with a plurality of alphanumeric keys for inputting alphabetic and numeric data and a plurality of function keys for setting and executing various functions.

Figure 2:
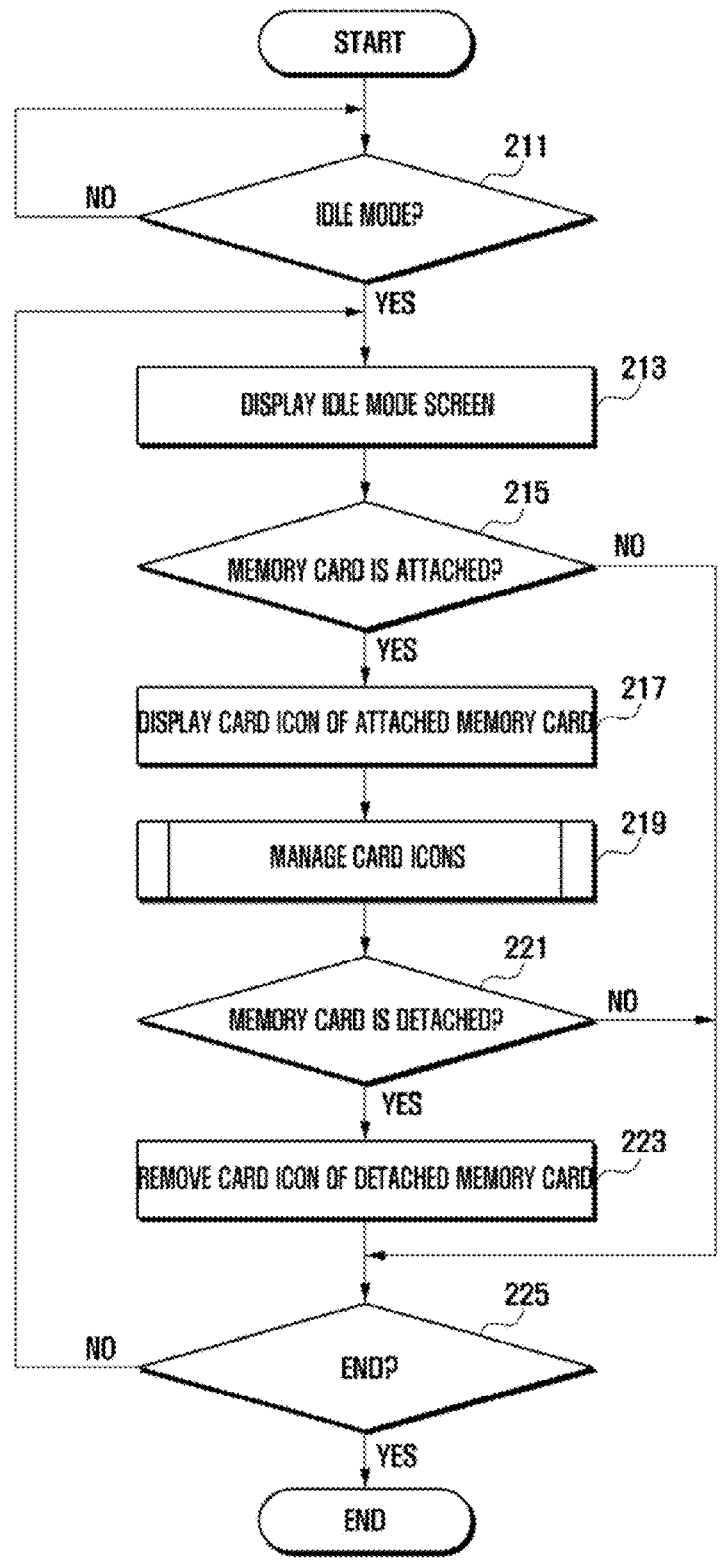
FIG. 2 is a flowchart illustrating a method for managing memory cards according to an exemplary embodiment of the present invention.

FIG. 2 is a flowchart illustrating a method for managing memory cards according to an exemplary embodiment of the present invention, and FIGS. 3 to 7 are screen images displayed during a method of managing memory cards according to an exemplary embodiment of the present invention.

Figure 3:
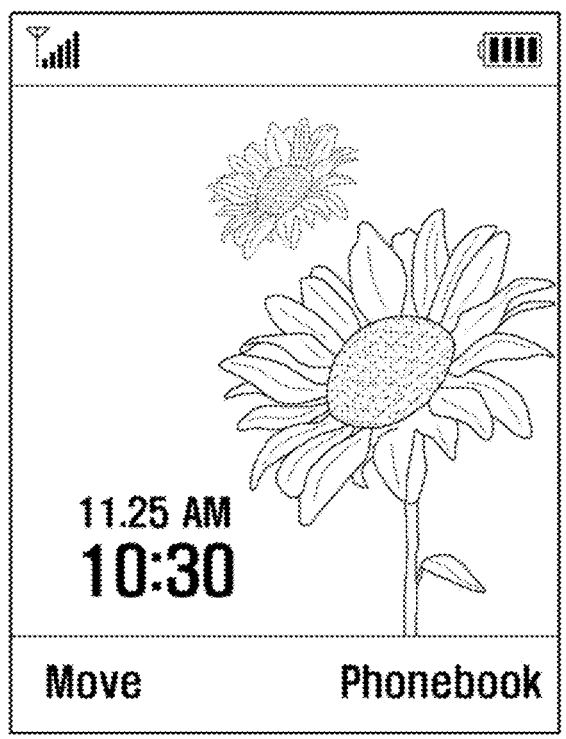
FIGS. 3 to 7 are screen images displayed during a method of managing memory cards according to an exemplary embodiment of the present invention.

Referring to FIG. 2, the control unit 150 determines whether the mobile terminal is in idle mode in step 211. If it is determined in step 211 that the mobile terminal is in the idle mode, the control unit 150 controls such that an idle mode screen is displayed as shown in FIG. 3 in step 213. In step 215, the control unit 150 monitors to determine if one or both of memory cards 120 and 130 are attached. If it is determined in step 215 that a memory card is attached, the control unit 150 detects the attachment of the memory card and displays a card icon corresponding to the memory card on the idle mode screen as shown in part <a> of FIG. 4 in step 217. It is to be understood that although a single memory card icon is displayed in part <a> of FIG. 4, this is merely for simplicity of example and that two icons could be displayed simultaneously. The card icon may be displayed in the form of combinations of images and texts that can identify the corresponding memory card 120 and/or 130 that is attached. In an exemplary implementation, the images and texts can be designed to indicate the amounts of data stored in the memory card in relation to the capacity of the memory card. In another exemplary implementation, the control unit 150 also can display the card icon in the form of a widget for activating the memory card.

Figure 4:
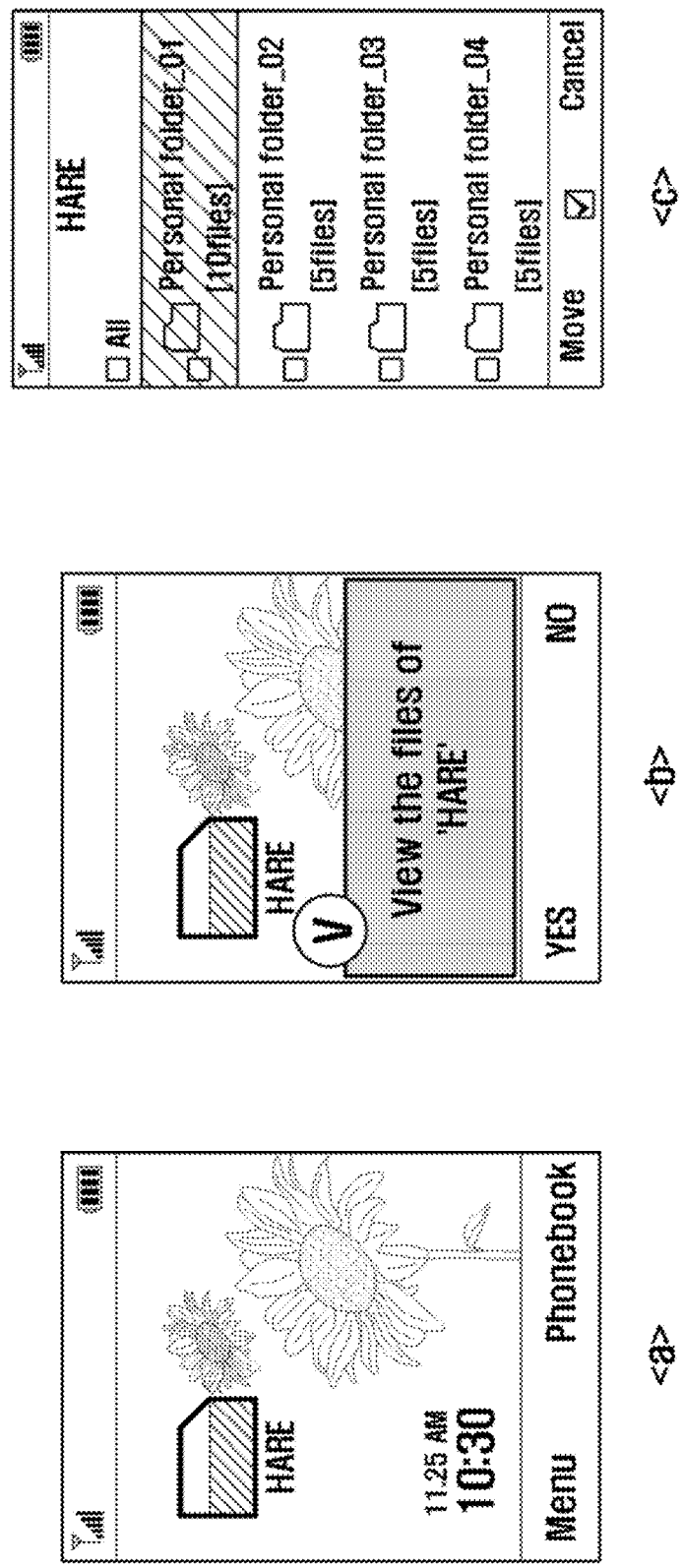

The control unit 150 also can display the card icon along with a popup window presenting a message asking whether to view the files of the corresponding memory card as shown in part <b> of FIG. 4. If it is determined not to display the files stored in the memory card, the control unit 150 controls such that the card icon is displayed while the popup window disappears as shown in part <a> of FIG. 4. Otherwise, if it is determined to display the files stored in the memory card, the control unit 150 controls such that the files stored in the corresponding memory card are displayed on the screen as shown in part <c> of FIG. 4. That is, the control unit 150 can display the folders and/or files stored in the memory card. Furthermore, the control unit 150 can execute a file if one of the files is selected by the user. If the presentation of the files is canceled, the control unit 150 controls such that the card icon is displayed as shown in part <a> of FIG. 4.

In step 219, the control unit 150 manages the card icons on the idle mode screen. At this time, the control unit 150 can copy or move the files to other positions in the memory cards 120 and 130. The control unit 150 also can display the files stored in the memory cards 120 and 130 represented by the card icons. The control unit 150 can control to change the position, image, and text of each card icon on the idle mode screen. The file management process is described later in more detail with reference to FIGS. 8 to 20.

Figure 5:
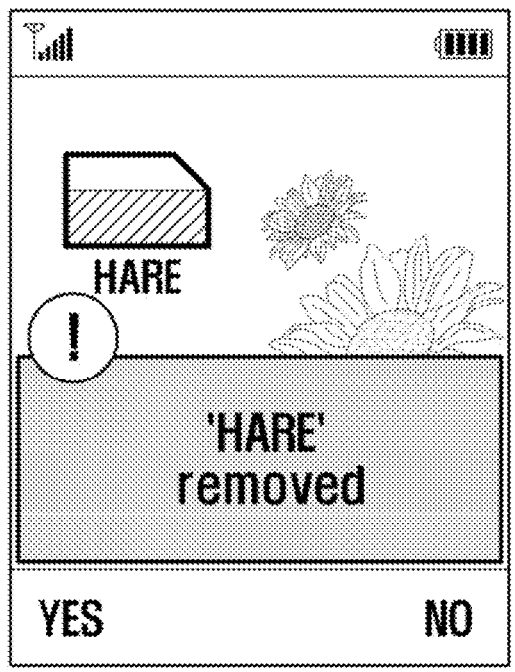

In step 221, the control unit 150 determines if the memory card is detached. If it is determined in step 221 that the memory card is detached, the control unit 150 controls such that the card icon representing the memory card disappears from the idle mode screen in step 223. In an exemplary implementation, the control unit 150 can control such that a popup window is presented that includes a message notifying of the detachment of the memory card before the disappearance of the card icon as shown in FIG. 5. The control unit 150 also can control such that the popup window and the card icon disappear after a predetermined time period of appearance. In step 225, the control unit 150 determines if a procedure termination request is detected. If it is determined in step 225 that the procedure termination request is detected, the control unit 150 ends the procedure.

Otherwise, if is determined in step 225 that a procedure termination request is not detected, the control unit 150 repeats steps 213 to 225. This means that multiple memory cards 120 and 130 can be attached to and detached from the mobile terminal 100. In other words, the process of FIG. 2 is repeated for each memory card. In an alternative embodiment, the process of FIG. 2 is performed a single time wherein all memory cards attached to or detached from the mobile terminal 100 are detected and treated accordingly (i.e., icons displayed and managed, etc.). In case that multiple memory cards are attached to the mobile terminal 100, the control unit 150 can manage the card icons corresponding to the memory cards on the idle mode screen.

Figure 6:
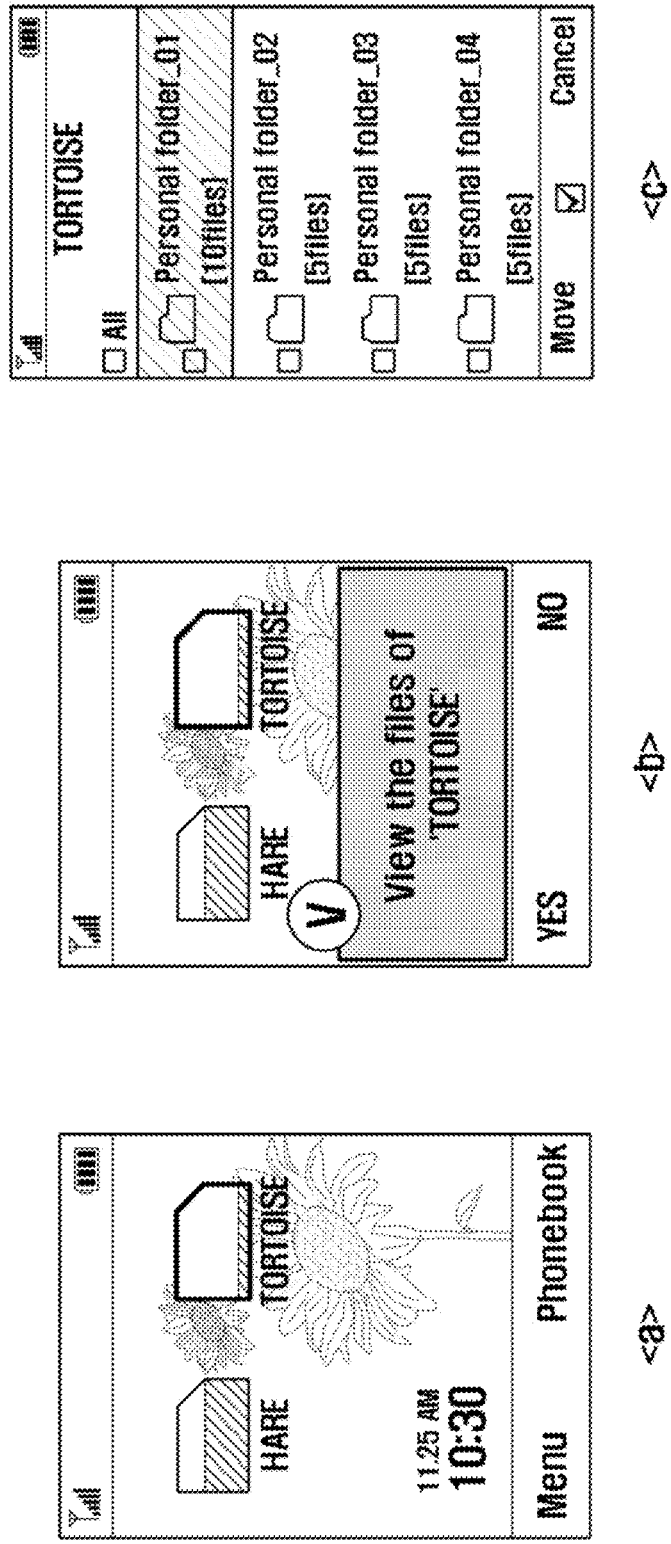
Figure 7:
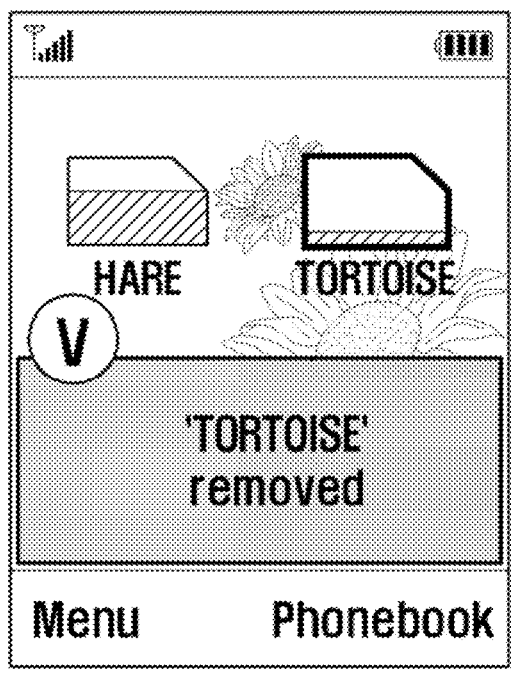

For example, when an additional memory card is attached to the mobile terminal 100, the control unit 150 controls such that the card icon of the newly attached memory card is displayed on the idle mode screen as shown in <a> of FIG. 6. The card icon of the newly attached memory card can be displayed along with a popup window presenting a message asking whether to view a list of the files stored in the memory card as shown in part <b> of FIG. 6. If it is determined not to display the file list, the control unit 150 controls such that the popup window disappears on the idle mode screen as shown in part <a> of FIG. 6. If it is determined to display the file list, the control unit 150 controls such that the list of files stored in the newly attached memory card is displayed on the idle mode screen as shown in part <c> of FIG. 6. After displaying the file list for a predetermined time period, the control unit 150 controls such that the card icon of the newly attached memory card is displayed on the idle mode screen along with the previous attached memory card as shown in part <a> of FIG. 6. Furthermore, if it is determined that the newly attached memory card is detached, the control unit 150 controls such that a popup window is presented that includes a message notifying of the detachment of the memory card before the disappearance of the card icon as shown in FIG. 7. The control unit 150 also can control such that the popup window and the card icon disappear after a predetermined time period of appearance.

Afterward, the control unit 150 can manage the card icons on the idle mode screen. The control unit 150 can control such that, when another memory card is attached, a popup window presenting an alarm message notifying that a new memory card is attached to the mobile terminal 100. The control unit 150 can control such that a specific card icon disappears from the idle mode screen as shown in part <a> of FIG. 4.

Figure 8:
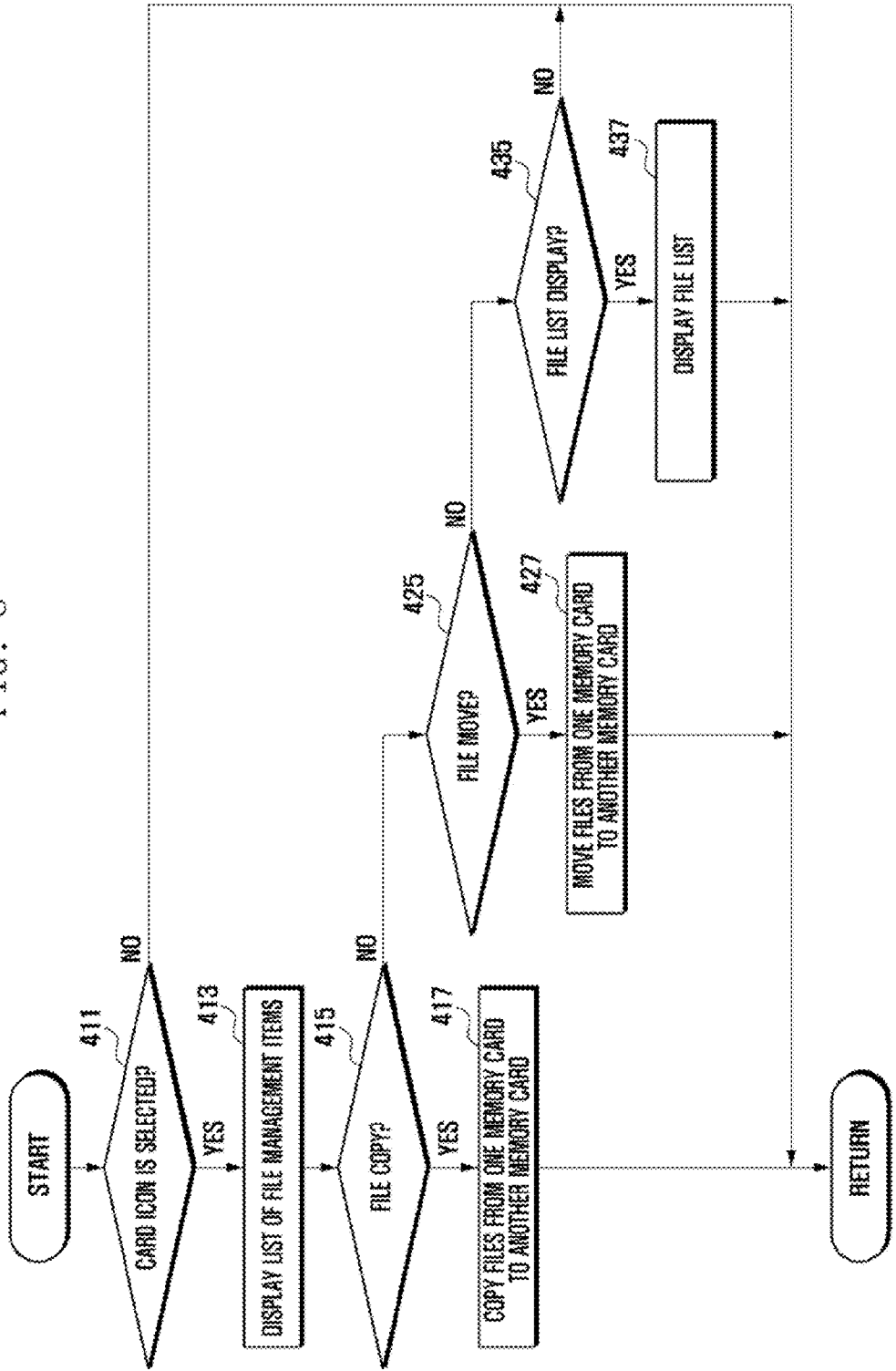
FIG. 8 is a flowchart illustrating steps of a file management process according to an exemplary embodiment of the present invention.

FIG. 8 is a flowchart illustrating steps of a file management process according to an exemplary embodiment of the present invention, and FIGS. 9 to 13 are screen images displayed during a file management process according to an exemplary embodiment of the present invention.

Figure 9:
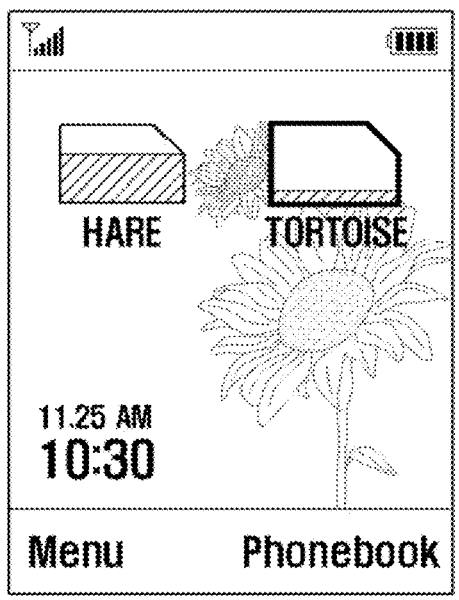

Referring to FIG. 8, the control unit 150 determines if one of the card icons displayed on the idle mode screen as shown in FIG. 9 is selected in step 411. In an exemplary implementation, in order to indicate which card icon is selected, a cursor is placed on the selected card icon. If a move command is input by means of the key input unit 180, the control unit 150 controls such that the cursor moves among the card icons, (e.g., icons entitled 'HARE' and 'TORTOISE'). If a selection command is received through the key input unit 180, the control unit 150 selects the card icon (e.g., 'TORTOISE') on which the cursor is placed.

Figure 10:
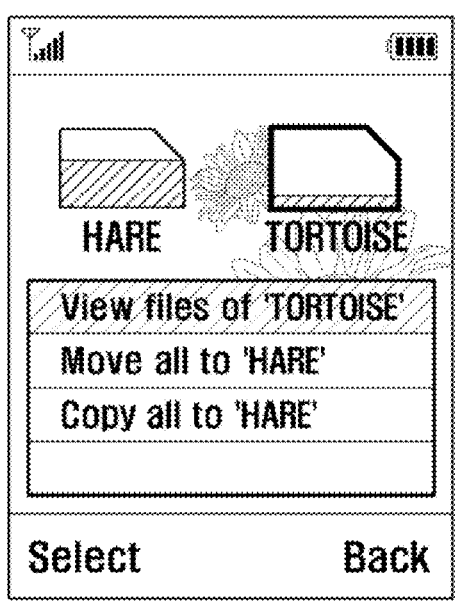

If it is determined in step 411 that a card icon is selected, the control unit 150 controls such that file management items are presented on the idle mode screen as shown in FIG. 10 in step 413. The file management items can be displayed in the form of a popup window listing the file management items. The file management items can include options for copying and moving the files stored in the selected memory card to another memory card and displaying a list of the files stored in the selected memory card. While the file management items are displayed, the control unit 150 detects a selection command and determines whether selection command is made to copy the file item in step 415.

If it is determined in step 415 that the selection command is made to copy the file item, the control unit 150 controls such that the files stored in the selected memory card are copied to another memory card or internal memory in step 417. That is, the control unit 150 creates files, copied from the source memory card, within the destination memory card. In the case of selecting the file copy option, the copied files are maintained in the source memory card. In the case that multiple memory cards are attached to the mobile terminal 100, the control unit 150 can control such that the copied files are replicated to at least one of the multiple memory cards simultaneously.

At this time, the control unit 150 can control such that a Graphic User Interface (GUI) screen showing the progress of disappearance of the popup window and transfer of the files from the source memory card to the destination memory card (e.g., from the 'TORTOISE' memory card to the 'HARE' memory card) is displayed as shown in part <a> of FIG. 11. Once the file copy has completed, the control unit 150 controls such that a popup window presenting a message notifying of the file copy completion is displayed on the idle mode screen as shown in part <b> of FIG. 11. Here, the control unit 150 can control such that the popup window appears for a predetermined time period and then disappears on the idle mode screen. The control unit 150 also can control such that the card icons modified as a result of the file copy process are presented as shown in part <c> of FIG. 11. As a result of the copying of the files from the 'TORTOISE' memory card to the 'HARE' memory card, the card icon representing the 'HARE' memory care is modified so as to indicate the increased amount of data relative to the total capacity.

Referring again to FIG. 8, if it is determined in step 415 that the selection command is not made to copy a file item, the control unit 150 determines whether the selection command is made to move a file item in step 425. If it is determined in step 425 that the selection command is made to move a file item, the control unit 150 controls such that the files stored in the source memory card represented by the selected card icon are moved to the destination memory card as shown in FIG.

12 in step 427. That is, the control unit 150 creates the files stored in the source memory card into the destination memory card. In the case of selecting the file move option, the moved files are deleted from the source memory card. In a case that multiple memory cards are attached to the mobile terminal 100, the control unit 150 can control such that the files are moved to at least one of the multiple memory cards simultaneously.

At this time, the control unit 150 controls such that a GUI screen showing the progress of the popup window disappearance and the moving of the files from the source memory card to the destination memory card is displayed as shown in part <a> of FIG. 12. Once the file move has completed, the control unit 150 controls such that a popup window presenting a message notifying of the file move completion is displayed on the idle mode screen as shown in part <b> of FIG. 12. Here, the control unit 150 can control such that the popup window appears for a predetermined time period and then disappears on the idle mode screen. The control unit 150 also can control such that the card icons modified as a result of the file copy process as shown in part <c> of FIG. 12. As the result of the move of the files from the 'TORTOISE' memory card to the 'HARE' memory card, the card icons representing the respective 'TORTOISE' memory card and the 'HARE' memory card are modified so as to indicate the increase of the data amount relative to the total capacity in the 'HARE' memory card and the deletion of data from the 'TORTOISE' memory card.

Figure 13:
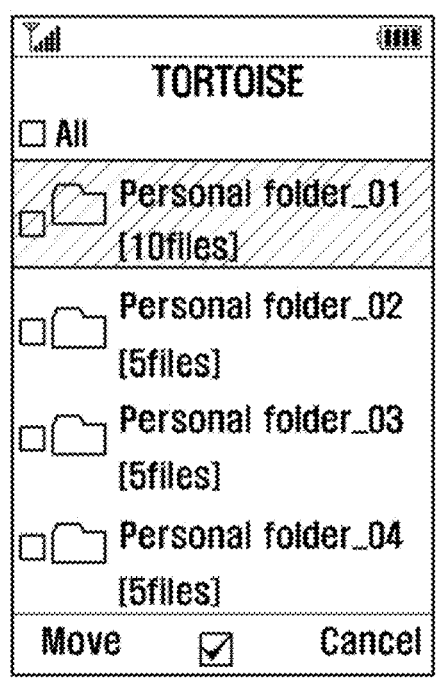

If it is determined in step 425 that the selection command is not made to move a file item, the control unit 150 determines whether the selection command is made to display a file list in step 435. If it is determined in step 435 that the selection command is made to display the file list, the control unit 150 controls such that the list of folders and/or files stored in the selected memory card is displayed as shown in FIG. 13 in step 437. That is, the control unit 150 controls such that the folders and/or files stored in the selected memory card are displayed to be executed selectively. The control unit 150 also can control such that the list is displayed for a predetermined time period and then disappears on the idle mode screen as shown in part <a> of FIG. 6.

Figure 14:
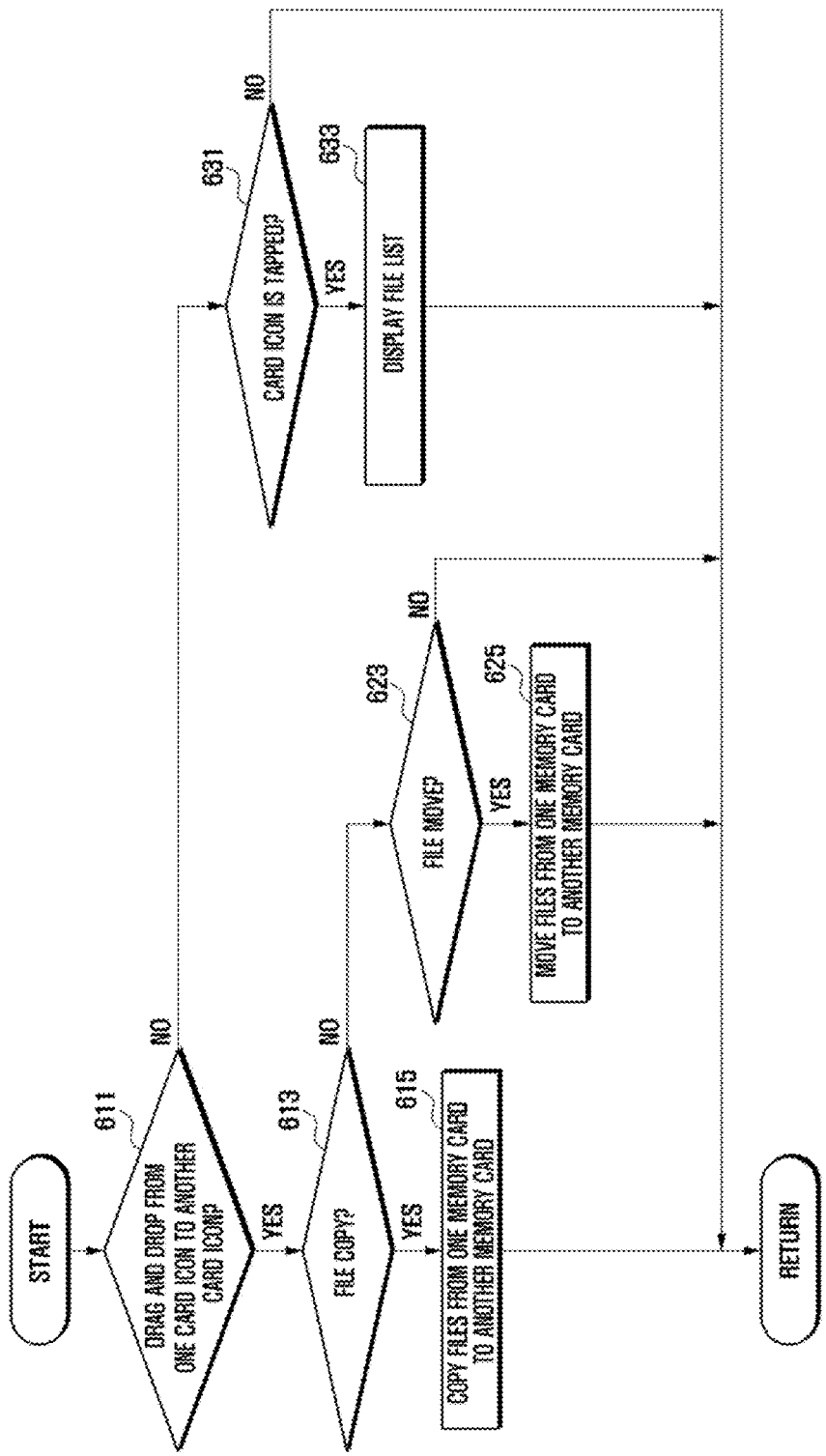
FIG. 14 is a flowchart illustrating steps of a file management process according to an exemplary embodiment of the present invention.

FIG. 14 is a flowchart illustrating steps of a file management process according to an exemplary embodiment of the present invention, and FIGS. 15 to 20 are screen images displayed during a file management process according to an exemplary embodiment of the present invention.

Figure 15:
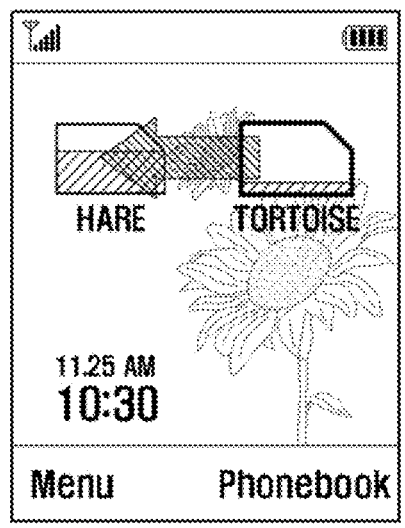
Figure 16:
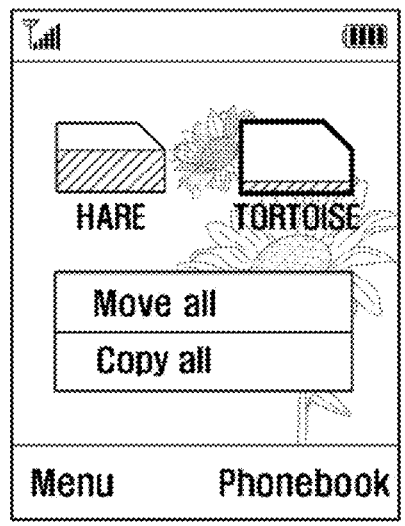

Referring to FIG. 14, the control unit 150 monitors to detect a management action and, if a management action is detected, determines whether the management action is a drag and drop action from one card icon to another card icon in step 611. In FIG. 14, it is assumed that a drag and drop action from the 'TORTOISE' memory card to the 'HARE' memory card is detected as shown in FIG. 15. If it is determined in step 611 that the detected management action is the drag and drop action, the control unit 150 controls such that available file management items are displayed on the idle mode screen as shown in FIG. 16. Here, the file management items can be displayed in the form of a list presented in a popup window. The file management items include a file copy item and a file move item.

While the available file management items are displayed, the control unit 150 determines whether a selection command is made to copy a file item in step 613. If it is determined in step 613 that the selection command is made to copy the file item, the control unit 150 controls to copy the files stored in the source memory card, i.e. 'TORTOISE' memory card, to the destination memory card, i.e. 'HARE' memory card in step 615. Here, the file copy command can be input by tapping the file copy item on the screen. As a result of the execution of the file copy command, the files copied from the source memory card are created in the destination memory card. In case of the file copy command, the copied files are maintained in the source memory card without deletion. In case that multiple memory cards are attached to the mobile terminal 100, the control unit 150 can copy the files to at least one of the multiple memory cards selectively.

At this time, the control unit 150 can control such that a GUI screen showing the progress of disappearance of the popup window and transfer of the files from the 'TORTOISE' memory card to the 'HARE' memory card is displayed as shown in part <a> of FIG. 17. Once the file copy has completed, the control unit 150 controls such that a popup window presenting a message notifying of the file copy completion is displayed on the idle mode screen as shown in part <b> of FIG. 17. Here, the control unit 150 can control such that the popup window appears for a predetermined time period and then disappears on the idle mode screen. The control unit 150 also can control such that the card icons modified as a result of the file copy process is presented as shown in part <c> of FIG. 17. As a result of the copy of the files from the 'TORTOISE' memory card to the 'HARE' memory card, the card icon representing the 'HARE' memory care is modified so as to indicate the increase of the data amount relative to its total capacity.

If it is determined in step 613 that the selection command is not made to copy a file item, the control unit 150 determines whether the selection command is made to move a file item in step 623. If it is determined in step 623 that the selection command is made to move a file item, the control unit 150 controls such that the files stored in the source memory card represented by the selected card icon are moved to the destination memory cards as shown in FIG. 18 in step 625. Here, the file move command can be input by tapping the file move item on the screen. As a result of the execution of the file move command, the files moved from the source memory card are created in the destination memory card. In case of the file move command, the moved files are deleted from the source memory card. In case that multiple memory cards are attached to the mobile terminal 100, the control unit 150 can move the files to at least one of the multiple memory cards selectively.

At this time, the control unit 150 can control such that a GUI screen showing the progress of disappearance of the popup window and transfer of the files from the 'TORTOISE' memory card to the 'HARE' memory card is displayed as shown in part <a> of FIG. 18. Once the file move has completed, the control unit 150 controls such that a popup window presenting a message notifying of the file move completion is displayed on the idle mode screen as shown in part <b> of FIG. 18. Here, the control unit 150 can control such that the popup window appears for a predetermined time period and then disappears on the idle mode screen. The control unit 150 also can control such that the card icons modified as a result of the file move process is presented as shown in part <c> of FIG. 18. As a result of the movement of the files from the 'TORTOISE' memory card to the 'HARE' memory card, the card icons representing the respective 'TORTOISE' memory card and the 'HARE' memory card are modified so as to indicate the increase of the data amount relative to the total capacity in the 'HARE' memory card and the deletion of data in the 'TORTOISE' memory card.

Figure 19:
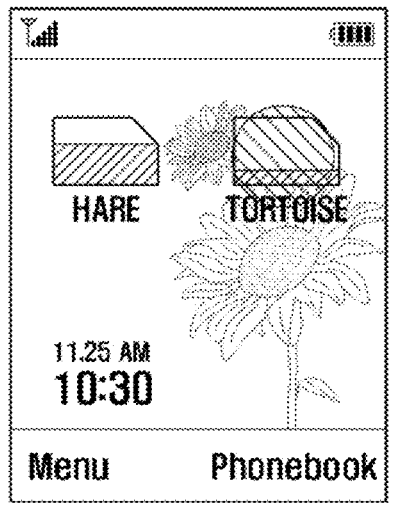
Figure 20:
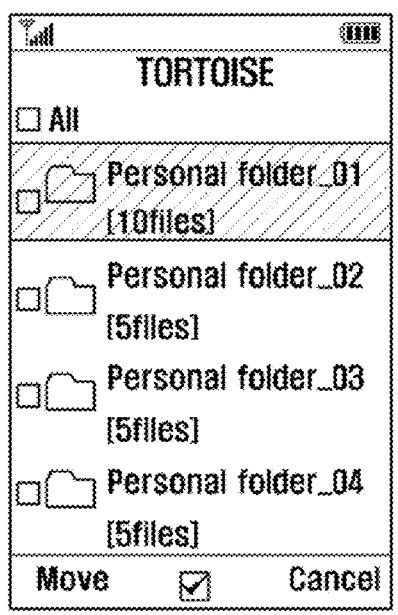

If it is determined in step 611 that the detected management action is not the drag and drop action, the control unit 150 determines whether the detected management action is a tap action on a card icon in step 631. In FIG. 14, it is assumed that the tap action made on the card icon representing the 'TORTOISE' memory card is detected as shown in FIG. 19. If it is determined in step 631 that the tap action is detected on the card icon, the control unit 150 controls such that a list of the folders and/or files stored in the 'TORTOISE' memory card is displayed as shown in FIG. 20 in step 633. That is, the control unit 150 controls such that the folders and/or files stored in the selected memory card are displayed to be executed selectively. The control unit 150 also can control such that the list is displayed for a predetermined time period and then disappears on the idle mode screen as shown in part <a> of FIG. 6.

Although the above description has been directed to the copying and moving of files between attached memory cards, the present invention is not limited thereto. For example, the copying and moving of files can be performed from a memory card to the internal memory 140 of the mobile terminal 100 and from the internal memory 140 to the memory card.

In the idle mode, the control unit 150 can control such that a terminal icon representing the internal memory of the mobile terminal 100 is displayed. Also, the control unit 150 can control such that, when a memory card is attached to the mobile terminal, the card icon representing the attached memory card is presented on the idle mode screen along with the terminal icon. The control unit 150 also can manage the terminal icon and card icons on the idle mode screen. The control unit 150 can copy or move the files stored in the attached memory cards to the internal memory 140 of the mobile terminal 100 and vice versa. The control unit 150 also can control such that, when a memory card is detached from the mobile terminal 100, the card icon representing the detached memory card disappears on the idle mode screen.

As described above, the exemplary detachable memory card management method of the present invention is capable of displaying the card icons representing the memory cards attached to the mobile terminal on the idle mode screen such that the user can identify the attached memory cards. Also, the detachable memory card management method of the present invention is capable of facilitating file management with simplified manipulation actions such as card icon selection. Also, an exemplary detachable memory card management method of the present invention is advantageous for the user to copy and move files between storage media and search the storage media for specific files, resulting in improvement of user's convenience.

While the invention has been shown and described with reference to certain exemplary embodiments thereof, it will be understood by those skilled in the art that variations changes in form and details may be made therein without departing from the spirit and scope of the invention as defined by the appended claims and their equivalents.

What is claimed is:

1. A method for managing memory cards, the method comprising:
    displaying, if at least two memory cards are detected, icons representing the memory cards on an idle mode screen;
    detecting selection of at least one of the icons;
    creating files, stored in a source memory card represented by one of the selected icons, in a destination memory card represented by another icon; and
    in response to an attachment of a new memory card, displaying a list of files stored in the card for a predetermined length of time, and if no input related to the displayed list of files is received for the predetermined time, displaying an icon corresponding to the new memory card on the idle mode screen,
    wherein each of the displayed icons includes an image to indicate amounts of data stored in the memory cards.

2. The method of claim 1, further comprising:
    detecting an input command, the input command being one of a copy command and a move command; and
    transferring the files to the destination memory card without deletion from the source memory card if the copy command is detected and with deletion of the files from the source memory card if the move command is detected.

3. The method of claim 2, wherein the detecting of selection of at least one of the icons comprises:
    selecting one of the memory cards as the source memory card; and
    selecting one of the other memory cards as the destination memory card.

4. The method of claim 3, wherein the detecting of selection of at least one of the icons comprises detecting a drag and drop action from one icon representing the source memory card to another icon representing the destination memory card.

5. The method of claim 4, further comprising displaying, if a tap action is detected on one of the icons, files stored in the memory card represented by the icon on which the tap action is made.

6. The method of claim 1, further comprising removing, if one of the memory cards is detached, the card icon representing the detached memory card from the idle mode screen.

7. A mobile terminal comprising:
    at least two detachable memory cards for storing files;
    a display unit for displaying icons representing the attached memory cards; and
    a control unit for detecting selection of at least one of the icons, for transferring the files stored in a source memory card represented by one of the selected icons to a destination memory card represented by another icon, for, in response to an attachment of a new memory card, displaying a list of files stored in the card for a predetermined length of time, and for, if no input related to the displayed list of files is received for the predetermined time, displaying an icon corresponding to the new memory card on the idle mode screen,
    wherein each of the displayed icons includes an image to indicate amounts of data stored in the memory cards.

8. The mobile terminal of claim 7, wherein the control unit detects an input command, the input command being one of a copy command and a move command, and transfers the files to the destination memory card without deletion from the source memory card if the copy command is detected and with deletion of the files from the source memory card if the move command is detected.

9. The mobile terminal of claim 8, wherein the control unit selects one of the memory cards as the source memory card and selects one of the other memory cards as the destination memory card.

10. The mobile terminal of claim 9, wherein the display unit comprises a touchscreen.

11. The mobile terminal of claim 10, wherein the control unit transfers the files from the source memory card to the destination memory card when a drag and drop action from one icon representing the source memory card to another icon representing the destination memory card is detected on the touchscreen.

12. The mobile terminal of claim 11, wherein the control unit displays, if a tap action is detected on one of the icons, the files stored in the memory card represented by the icon on which the tap action is made.

13. The mobile terminal of claim 7, wherein the control unit removes, if one of the memory cards is detached, the card icon representing the detached memory card from the idle mode screen.

14. The method of claim 1, further comprising:
displaying a file management list in a pop-up window on the idle screen, the file management list including at least one file management command.

15. The mobile terminal of claim 7, wherein the display unit displays a file management list in a pop-up window on the idle screen, the file management list including at least one file management command.

* * * * *